United States Patent [19]

Armbruster et al.

[11] Patent Number: 5,793,799
[45] Date of Patent: Aug. 11, 1998

[54] SWITCHABLE CIRCUIT FOR PROCESSING AND DEMODULATING DIGITAL AND ANALOG SIGNALS

[75] Inventors: Veit Armbruster, St. Georgen; Herbert Peusens; Gerd Siegel, both of Brigachtal, all of Germany

[73] Assignee: Deutsche Thomson-Brandt GmbH, Villingen-Schwenningen, Germany

[21] Appl. No.: 500,162

[22] Filed: Jul. 10, 1995

[30] Foreign Application Priority Data

Aug. 3, 1994 [DE] Germany ............... 44 27 396.7
Oct. 4, 1994 [DE] Germany ............... 44 35 240.9

[51] Int. Cl.$^6$ .................. H04L 25/00; H04L 27/00; H03D 3/24
[52] U.S. Cl. .................. 375/216; 375/376; 364/180; 455/142; 455/553
[58] Field of Search ............... 375/216, 219, 375/340, 375; 364/180; 395/889; 455/74, 142, 553

[56] References Cited

U.S. PATENT DOCUMENTS 5,124,672 6/1992 Kuisma ................... 332/103

Primary Examiner—Chi H. Pham
Assistant Examiner—William Luther
Attorney, Agent, or Firm—Joseph S. Tripoli; Frederick A. Wein

[57] ABSTRACT

Components for analog or digital input signals are in each case connected by switchable means to a controllable oscillator. The switch condition of the switchable means is set automatically and/or manually as a function of the input signal.

6 Claims, 2 Drawing Sheets

1

SWITCHABLE CIRCUIT FOR PROCESSING AND DEMODULATING DIGITAL AND ANALOG SIGNALS

BACKGROUND

The present invention relates to the processing of digital and analog signals.

An IF amplifier, which includes a PLL, is preferably used for demodulation for the reception of present-day analog television signals. For the reception of future digital television signals, after tuning and frequency conversion in the tuner, a further converter would be required in order to carry out analog/digital conversion in a suitable frequency band. Thus, at the present time, it is necessary to use separate circuits for respectively processing digital and analog signals.

SUMMARY OF THE INVENTION

It is an object of the present invention to provide a simple method wherein digital and analog input signals can be processed by the same circuit in order to obviate the need for separate circuits.

According to aspects of the present invention, the components for analog or digital input circuits are, in each case, connected by switchable means coupled to a controllable oscillator. The switchable means are set automatically and/ or manually as a function of the input signal.

A circuit has a controllable oscillator, which is connected by switchable means to either a filter or to a comparator which is controlled by the input signal, or to a phase locked loop which is independent of the input signal.

In the case of a digital input signal, said digital signal passes through a controllable amplifier and is converted in a mixer having a controllable oscillator, which is coupled responsive an external signal independent of the input signal, to a second IF circuit for digital signal processing. At the same time, a comparator and the filter for analog demodulation are turned "off".

In the case of an analog signal, the signal passes through a controllable amplifier and is compared, in a comparator and filter, with the controllable oscillator. At the same time, the analog signal and the signal of the controllable oscillator are fed to the mixer. The conditioned analog output signal is present at the output of the mixer.

The filter is designed as a loop filter, the comparator as a phase comparator, and the controllable oscillator is a voltage controlled oscillator (VCO).

In this manner, two circuit arrangements for respective processing of analog and digital signals, are no longer necessary.

BRIEF DESCRIPTION OF THE DRAWINGS

The present invention is explained in the following text, with reference to the drawings, in which.

DETAILED DESCRIPTION OF THE PREFERRED EMBODIMENT

Figure 1:
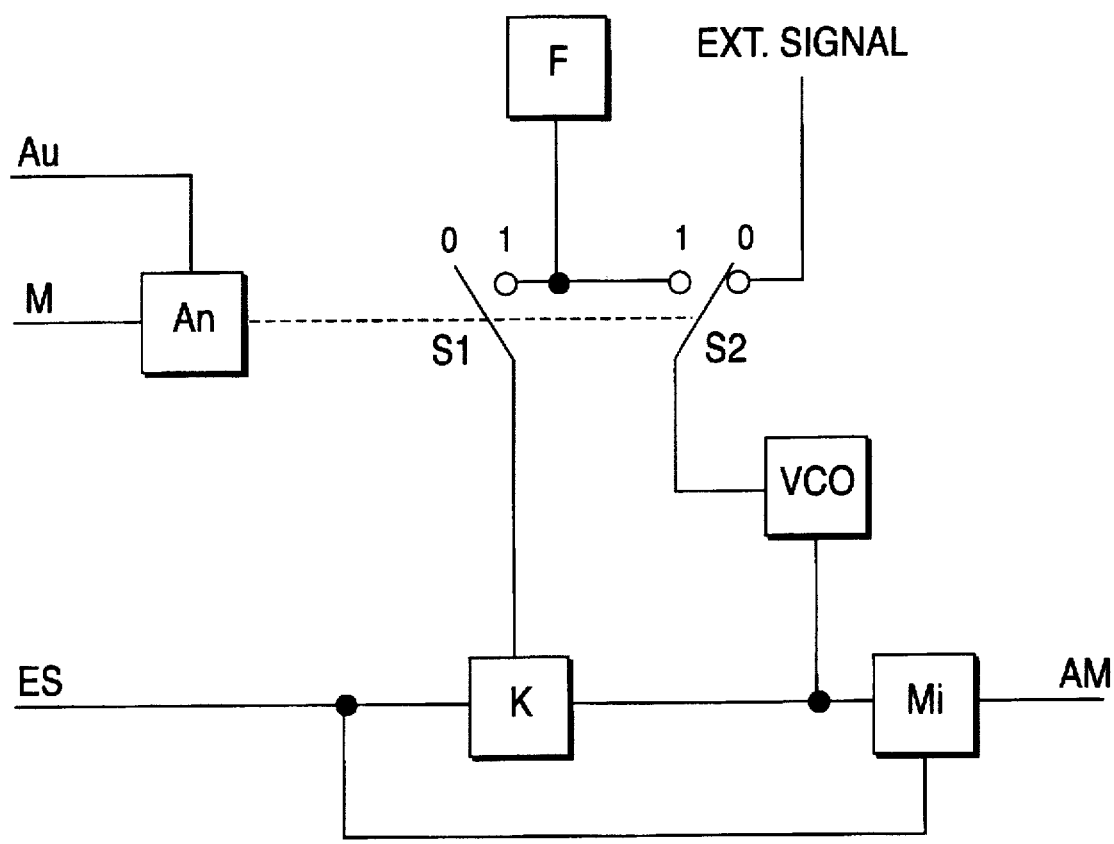
FIG. 1 shows a method of processing signals according to aspects of the present invention.

FIG. 1 shows the input signal ES which is coupled to a comparator K and to a mixer Mi. The switch S1 connects the output signal of the comparator to a filter F, as a function of a switch position determining circuit An. The switch S2 connects the VCO either to the filter F or to an external signal.

The switch position determining circuit An is provided with either manual switching signal M or automatic switching signal Au and identifies whether the input signal ES is a digital or analog signal. The voltage controllable oscillator VCO is connected to the input of mixer Mi as is the input signal ES. The respective conditioned signal for digital and analog input signals ES is present at the output AM of the mixer Mi. The switch S2 is driven by switch position determining circuit An, is responsive to the type of input signal ES in the same way as switch S1.

If a digital input signal ES is present, the switch position determining circuit AN identifies this fact and sets the switches S1, S2 to the position 0. The determination that a digital input signal ES is present can also be carried out manually. When the switches S1 and S2 are in this digital position, an external signal is coupled to the controllable oscillator VCO. The mixer Mi now receives the VCO signal conditioned in this way, and the input signal. A second IF for digital further-processing is now present at the output AM of the mixer Mi. If the switches S1 and S2 are in the switch position I, then the input signal Es is compared by filter F and comparator K with the controllable oscillator VCO. The mixer Mi now receives both the VCO signal conditioned in this way and the input signal. A conditioned analog signal for analog further-processing is now present at the output AM of the mixer Mi.

Figure 2:
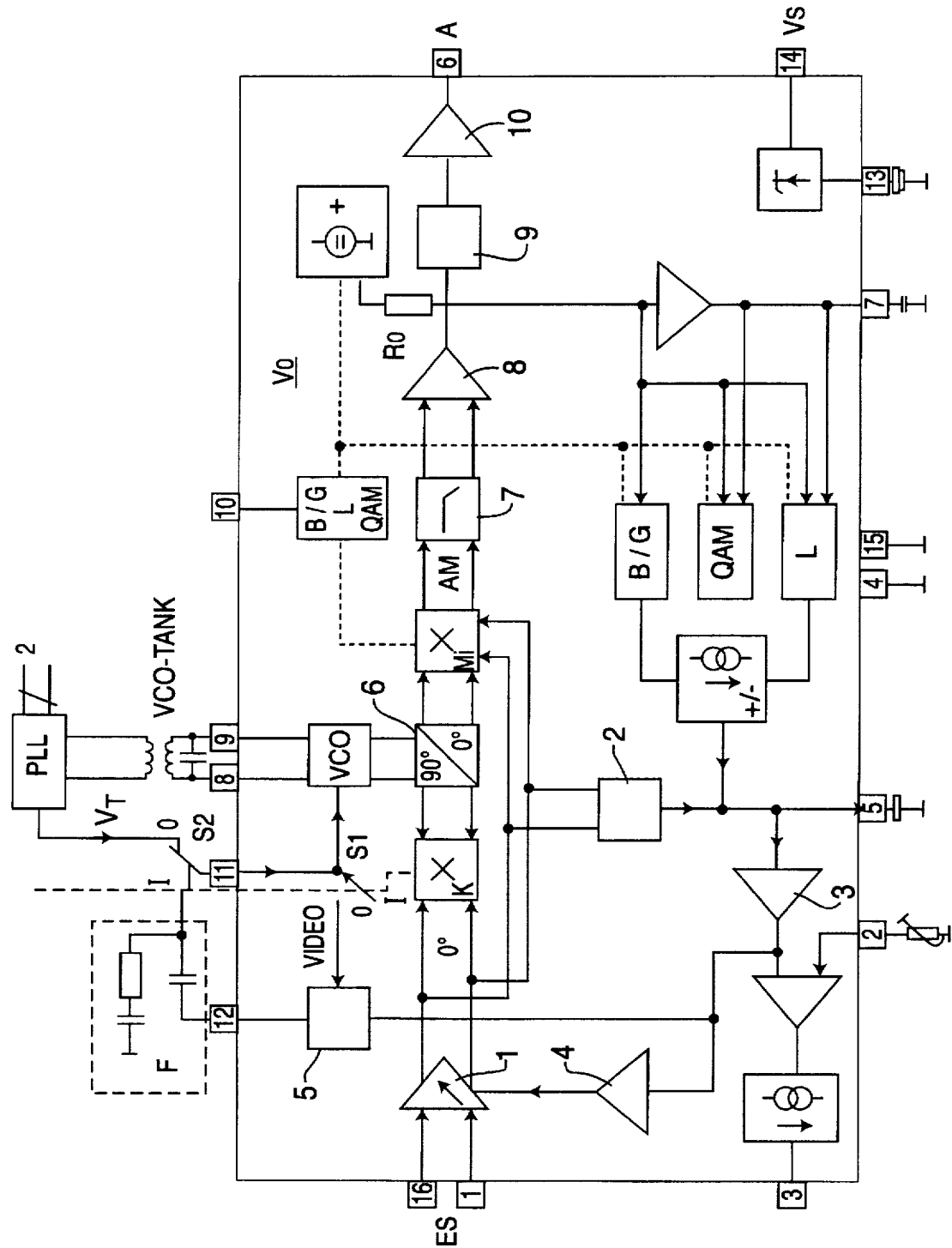
FIG. 2 shows a circuit for processing signals according to aspects of the present invention.

FIG. 2 shows an IF (intermediate frequency) amplifier circuit V. The input signal ES passes through a controllable amplifier 1 and is compared in a phase comparator K, for carrier recovery, with the controllable oscillator VCO. The output of the comparator K is connected via the switch S1 to loop filter F, with loop filter F connected via switch S2 to the VCO. As a consequence, the phase of the controllable oscillator VCO is slaved to be synchronous with the input signal, and said oscillator VCO is connected to the mixer Mi. After the amplifier 1, the input signal ES is coupled to the mixer Mi. The filter F includes a capacitor and a resistor connected in series to switch position I of the switch S2. Switch S1, the controllable oscillator VCO and the switch S2 are coupled to one another as shown. In position 0, switch S2 connects the external signal to the controllable oscillator VCO. The external signal is generated by a crystal-accurate phase locked loop.

If an analog input signal is present at the amplifier 1, the switches S1 and S2 are in the position I. The signal from the loop filter F passes via the switch S2 to the controllable oscillator VCO, in the same way that the signal from the phase comparator K also passes via the switch S1 to the controllable oscillator VCO. The signal thus obtained is coupled from the controllable oscillator VCO, via a phase converter 6, to the mixer Mi. An analog signal, which is passed via the elements 7, 8, 9 and 10 to the output of the circuit A, is present at the output AM of the mixer Mi. The demodulated video signal is now present at this point.

If a digital input signal is present on the amplifier stage 1, then the switches S1 and S2 are in the switch position 0. The controllable oscillator VCO is coupled to an externally provided signal which is derived from a crystal-accurate control loop and controllable oscillator VCO will oscillate independently of the input signal. The signal thus obtained is coupled from the controllable oscillator VCO, via a phase converter 6, to mixer Mi. A second IF, which is passed via the elements 7, 8, 9 and 10 to the output of the circuit A, is present at the output AM of the mixer Mi.

The arrangement shown can be used for other purposes, e.g., the use controllable oscillator VCO for two purposes, on the one hand to obtain the analog signals and on the other hand to obtain the second IF signals.

We claim:

1. A circuit operable in a first digital mode and a second analog mode for processing and demodulating input signals comprising digital and analog input signals, respectively said circuit having components including a comparator, a filter, and an external signal which are in each respective case assigned by switchable means to a controllable oscillator, wherein the controllable oscillator is connected in said analog mode corresponding to said analog input signals to both said filter and said comparator, and in said digital mode corresponding to said digital input signals to an externally derived signal, wherein said controllable oscillator is controlled by said input signals when in said analog mode, and is independent of said input signals when in said digital mode.

2. The circuit according to claim 1, wherein the switchable means are switched according to whether said input signal is said digital or analog signal, and wherein the switchable means are responsive to a first signal for manually switching, and to a second signal for automatically switching between said digital and analog input signals.

3. The circuit according to claim 1, wherein the externally derived signal is generated by a crystal-accurate phase locked loop.

4. The circuit according to claim 1, wherein for said analog input signal, the circuit operates as an analog demodulator and supplies an analog signal at an output terminal, and in the case of said digital input signal, a second intermediate frequency signal (IF) is provided to the output terminal.

5. The circuit according to claim 1, wherein the filter is a loop filter, the comparator is a phase comparator, and the controllable oscillator is a voltage controllable oscillator (VCO).

6. The circuit according to claim 4, wherein for said analog input signal, said analog signal at the output terminal is an analog video signal between the frequency of 0 and 5 MHz and in the case of said digital input signal, the second IF provided at the output terminal has a frequency within a band between 2 and 10 Mhz.

* * * * *